United States Patent Office 2,805,999
Patented Sept. 10, 1957

2,805,999

DETERGENT COMPOSITIONS CONTAINING DERIVATIVES OF 4:4'-DIAMINOSTILBENE-DISULFONIC ACID-(2:2')

Franz Ackermann, Binningen, Switzerland, assignor to Ciba Limited, Basel, Switzerland No Drawing. Application October 2, 1950,
Serial No. 188,072

Claims priority, application Switzerland October 18, 1949

4 Claims. (Cl. 252—117)

The present invention relates to new colorless to substantially colorless derivatives of 4:4'-diaminostilbene-disulfonic acid-(2:2').

It has been found that colorless to substantially colorless derivatives of 4:4'-diaminostilbene-disulfonic acid-(2:2'), of the general formula

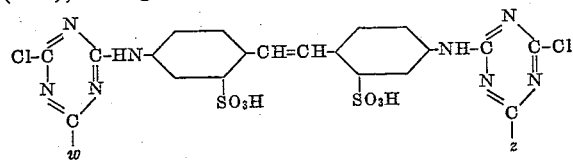

in which w and z each indicates an amino group in which at least one hydrogen atom is substituted by an unsubstituted alkyl group having 1 to 4 carbon atoms, are valuable optical bleaching agents.

According to one feature of the invention compounds of the formula set forth above are obtained when 2 mols (the expression "mol" herein means molecular proportion or proportions) of cyanuric chloride are reacted in any sequence with (a) one mol of 4:4'-diaminostilbene-disulfonic acid-(2:2'), or a water soluble salt thereof, and (b) one mol of an alkyl amine having only alkyl groups with 1 to 4 carbon atoms which alkyl groups are unsubstituted.

According to a further feature of the invention the same compounds are also obtained by starting from a 4-amino-stilbene-disulfonic acid-(2:2') which contains in the 4'-position a group convertible into an amino group, such as an acylamino or nitro group.

When the 4-nitro-4'-aminostilbene-disulfonic acid-(2:2') is used as starting material, 1 mol of cyanuric chloride is reacted in any sequence with 1 mol of this acid or of a water-soluble salt thereof and with 1 mol of an amine set forth above under (b), the nitro group of the condensation product produced is reduced to the amino group and one further mol of cyanuric chloride is reacted in any sequence with one mole of the amino compound thus produced and with 1 mol of an amine specified under (b).

The new compounds of the formula set forth, and also their salts, have no dyestuff character but they possess, in accordance with their constitution, a more or less pronounced affinity for various substrata, as for example vegetable and animal fibre. On these substrata they have a blue to violet fluorescence in ultra-violet light. On account of these properties the products of the invention are capable of increasing the white content of undyed material and the purity of shade in the case of dyed material.

As alkyl amines and dialkyl amines which provide the substituents w and z of the general formula set forth above and which contain only unsubstituted alkyl groups with 1 to 4 carbon atoms, there may be employed for the reaction of this invention methylamine, ethylamine, propylamine, butylamine, dimethylamine, dipropylamine, dibutylamine, and furthermore amines with branched chains, such as isopropylamine, isobutylamine, di-isobutylamine.

As salts of the products of the invention there are primarily concerned the water-soluble salts with ammonia or amines but preferably the alkali salts.

The manufacture of the new derivatives of 4:4'-diaminostilbene-disulfonic acid-(2:2') according to the invention may for example be carried out in such a manner that 2 mols of cyanuric chloride are reacted according to the generally known methods for the reaction of this compound with amines, for example in the presence of water or of mixtures of water with organic solvents, such as acetone and if desired in the presence of buffer substances or acid-binding agents, such as sodium acetate, alkali carbonates or alkali hydroxides, with one mol of 4:4'-diaminostilbene-disulfonic acid-(2:2') or a water-soluble salt thereof, and the 4:4'-bis-[2:4-dichloro-1:3:5-triazyl-(6)-amino]-stilbene-disulfonic acid-(2:2') or a water-soluble salt thereof produced subsequently reacted, if desired in the presence of buffer substances or acid-binding agents, with 2 mols of one of the alkyl amine specified above or with one mol each of two different ones of the amines specified above.

In this manner symmetrical products are obtained.

If it is desired to produce asymmetrically substituted compounds there is advantageously employed as starting material the 4-nitro-4'-amino-stilbene-disulfonic acid-(2:2'). This may be condensed in the known manner with cyanuric chloride to the 4-nitro-4'-[2:4-dichloro-1:3:5-triazyl-(6)-amino]-stilbene-disulfonic acid-(2:2'), whereupon at least one of the two chlorine atoms is replaced by reaction with amines specified above.

It is also possible to replace 1 chlorine atom of the cyanuric chloride initially by reaction with 1 mol of amines specified above and subsequently to carry out the condensation with the 4-nitro-4'-amino-stilbene-disulfonic acid-(2:2').

Subsequently the nitro group in the condensation product thus obtained is converted by reduction, for example with iron in the presence of an acid, to the amino group, and this in turn again substituted in an analogous manner to that described above for the other amino group.

Among the compounds of the general formula set forth above which may be produced by the processes above set forth the following may be mentioned: 4:4'-bis-[2-methylamino - 4 - chloro - 1:3:5 - triazyl - (6) - amino] - stilbene-disulfonic acid-(2:2') of the formula

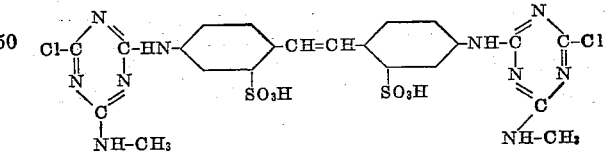

furthermore 4:4'-bis - [2 - ethylamino - 4 - chloro-1:3:5-triazyl - (6) - amino] - stilbene - disulfonic acid - (2:2'), 4:4' - bis - [2 - butylamino - 4 - chloro - 1:3:5 - triazyl-(6) - amino] - stilbene - disulfonic acid-(2:2'), 4:4'-bis-[2 - n - propylamino - 4 - chloro - 1:3:5 - triazyl - (6)-amino] - stilbene - disulfonic acid-(2:2'), and 4-[2-di-isobutylamino - 4 - chloro - 1:3:5 - triazyl - (6) - amino]-4' - [2 - methylamino - 4 - chloro - 1:3:5 - triazyl - (6)-amino]-stilbene-disulfonic acid-(2:2').

The application of the new products rendered available by the present invention may take place in such a manner that the material to be treated is saturated with solutions, especially aqueous solutions, of the specified compounds and, after hydro-extracting or squeezing out, dried. For example white goods, especially after a wash conducted in the customary manner, may be after-treated with the products of the invention. Furthermore the new products may be employed for the after-treatment of printed cellulosic materials.

The compounds rendered available by the present process may also be added in the course of the process of manufacture of the material to be treated, for example by introducing them into paper pulp.

In general small quantities of the products of the invention suffice in order to obtain the desired result.

The compounds obtainable by the present process can also be applied in admixture with auxiliary substances such as are used for the improvement of fibrous materials, for example in conjunction with washing agents (for example together with soaps, salts of sulfonate washing agents, as for example of sulfonated benzimidazoles substituted on the 2-carbon atom by higher alkyl residues, or also of monocarboxylic acid esters of 4-sulfophthalic acid with higher fatty alcohols, furthermore together with fatty alcohol sulfonates or condensation products of higher fatty acids with aliphatic hydroxy or amino sulfonic acids). In this manner the materials to be improved can be simultaneously washed and bleached. A particularly pronounced brightening effect is achieved when undyed vegetable or animal fibres, especially cotton or wool are treated with mixtures containing such washing agents.

As materials which can be improved according to this process the following may for example be mentioned:

Nitrogen-containing natural and artificial materials such as wool, silk or synthetic polyamide fibres; also cellulosic materials such as cellulose or paper and further textile materials of cotton, linen or regenerated cellulose, including staple fibre, finally synthetic materials produced for example by polymerisation. The best effects are however produced by the application of the present process to vegetable and animal fibres. The material to be improved may exist in any form, for example in the form of fibres or also as film. The material may in addition be undyed, dyed or printed.

The following examples illustrate the invention the parts and percentages being by weight unless otherwise stated and the relation between parts by weight and parts by volume being the same as that between the kilogram and the litre.

*Example 1*

To a neutral aqueous solution of 710 parts of the disodium salt of the 4:4'-bis-[2:4-dichloro-1:3:5-triazyl-(6)-amino] - stilbene - disulfonic acid-(2:2') produced by the known method by reaction of 2 mols of cyanuric chloride with 1 mol of 4:4' - diaminostilbenedisulfonic acid-(2:2'), are added at 10° C., 450 parts of 50 percent aqueous monoethylamine solution. Thereupon the temperature of the reaction mixture is increased to 35° C. and stirring carried out for 2–3 hours at this temperature. The disodium salt of the 4:4'-bis-[2-ethylamino-4 - chloro - 1:3:5 - triazyl - (6) - amino] - stilbene - disulfonic acid-(2:2') produced of the formula

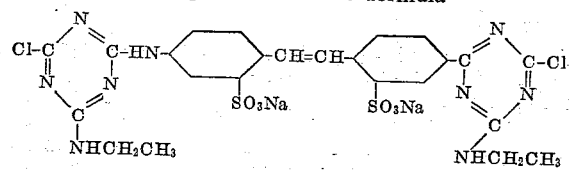

is separated by addition of sodium chloride, filtered, washed with sodium chloride solution and dried. The new product is obtained as a pale yellow water-soluble powder.

By employing instead of the monoethylamine solution used above, equimolecular quantities of monomethylamine, propylamine or butylamine, products are obtained of quite similar properties. The products may be employed as brightening agents for cellulosic materials.

*Example 2*

To a fine suspension of 18 parts of 2:4-dichloro-6-methylaminotriazine and 2 parts of a fatty alcohol sulfonate in 300 parts of water is added at 40–45° C. within 1 hour a neutral aqueous solution of the disodium salt of 18.5 parts of 4:4'-diamino-stilbene-disulfonic acid-(2:2'). Thereupon within 5 hours a solution of 5.5 parts of sodium carbonate in 50 parts of water is gradually added in such a manner that the reaction mixture reacts neutral to weakly acid. As soon as no more starting material is present sodium chloride is introduced and the whole is allowed to cool, the separated condensation product filtered, washed with sodium chloride solution and dried. The disodium salt obtained of the 4:4'-bis-[2-methylamino - 4 - chloro - 1:3:5 - triazyl-(6)-amino]-stilbene-disulfonic acid-(2:2') is a light coloured powder soluble in water.

*Example 3*

Undyed cotton yarn is treated in a bath ratio of 1:30 for about ¼ hour at room temperature in a bath which contains per litre 0.01 gram of the condensation product obtained according to Example 1. After rinsing and drying the yarn thus treated has a higher white content than the corresponding untreated material.

*Example 4*

Undyed woolen material is treated in a bath ratio of 1:40 for ½ hour at 40–45° C. in a bath which contains per litre 0.05 gram of the condensation product obtained according to Example 1 and 1.25 grams of formic acid. After rinsing and drying the wool thus treated possesses a higher white content than the untreated starting material.

*Example 5*

100 parts of a fused soap mass, containing for example 60 percent fatty acid, are mixed with 0.05 to 0.5 part of the product according to Example 1 and thereupon allowed to cool. A textile material washed with the soap-like mass obtained possesses a whiter appearance than corresponding material washed with soap alone.

*Example 6*

Cotton is treated in a bath ratio of 1:30 for 2 hours at 85° C. in a bath containing per litre 2.5 parts of water glass of 38° Bé.
5 parts of 30 percent hydrogen peroxide solution and
0.06 part of the product obtainable according to Example 1

After rinsing and drying the cotton thus treated possesses a higher white content than a material which has been treated in a similar bath to which the addition of the product according to Example 1 has not been made.

What I claim is:

1. An optical bleaching agent consisting essentially of a water-soluble organic anion-active detergent selected from the group consisting of water-soluble soaps and synthetic organic, non-soap, anion-active, sulfonated detergents and 0.05 to 0.5 percent by weight of a water soluble salt of a colorless to substantially colorless derivative of 4:4'-diaminostilbene-disulfonic acid-(2:2') of the general formula

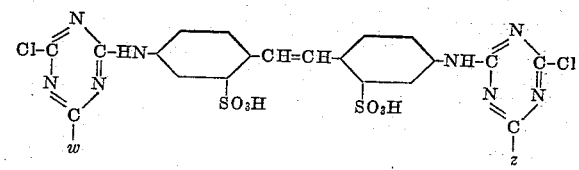

in which $w$ and $z$ each indicates an amino group in which at least one hydrogen atom is substituted by an unsubstituted alkyl group having 1 to 4 carbon atoms.

2. A process for enhancing the brightness of organic fibrous material which comprises impregnating the material with an aqueous solution of an optical bleaching agent consisting essentially of a water soluble salt of a colorless to substantially colorless derivative of 4:4'- diaminostilbene-disulfonic acid-(2:2′) of the general formula

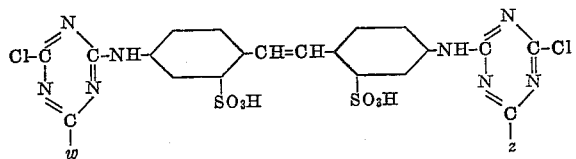

in which $w$ and $z$ each indicates an amino group in which at least one hydrogen atom is substituted by an unsubstituted alkyl group having 1 to 4 carbon atoms, and subsequently drying the impregnated material.

3. A process for enhancing the brightness of organic fibrous material which comprises impregnating the material with an aqueous solution of an optical bleaching agent consisting essentially of an alkali salt of the 4:4′-bis-[2-ethylamino-4-chloro-1:3:5-triazyl-(6)-amino]-stilbene-disulfonic acid-(2:2′) of the formula

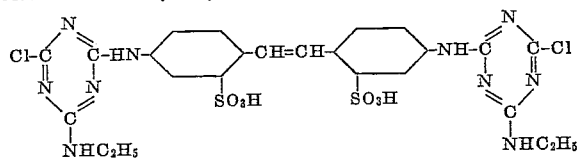

and subsequently drying the impregnated material.

4. A process for enhancing the brightness of organic fibrous material which comprises impregnating the material with an aqueous solution of an optical bleaching agent consisting essentially of a water-soluble organic anion-active detergent selected from the group consisting of water-soluble soaps and synthetic organic, non-soap, anion-active, sulfonated detergents and 0.05 to 0.5 percent by weight of a water-soluble salt of colorless to substantially colorless derivative of 4:4′-diaminostilbene-disulfonic acid-(2:2′) of the general formula

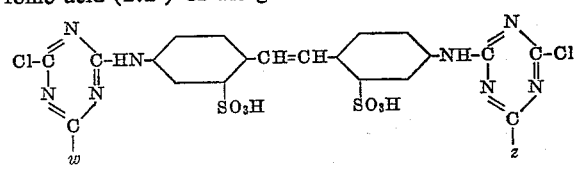

in which $w$ and $z$ each indicates an amino group in which at least one hydrogen atom is substituted by an unsubstituted alkyl group having 1 to 4 carbon atoms, and subsequently drying the impregnated material.

References Cited in the file of this patent

UNITED STATES PATENTS

| | | |
|---|---|---|
| 564,835 | Newman | July 28, 1896 |
| 2,171,427 | Eggert | Aug. 29, 1939 |
| 2,221,361 | Schmid | Nov. 12, 1940 |
| 2,368,844 | Keller | Feb. 6, 1945 |
| 2,376,743 | Wendt | May 22, 1945 |
| 2,473,475 | Keller | June 14, 1949 |
| 2,539,766 | Zweidler | Jan. 30, 1951 |
| 2,612,501 | Wilson | Sept. 30, 1952 |
| 2,618,636 | Williams et al. | Nov. 18, 1952 |

FOREIGN PATENTS

| | | |
|---|---|---|
| 596,405 | Great Britain | Jan. 2, 1948 |
| 624,051 | Great Britain | May 26, 1949 |
| 624,052 | Great Britain | May 26, 1949 |